United States Patent
Sengoku et al.

(10) Patent No.: US 8,185,310 B2
(45) Date of Patent: May 22, 2012

(54) NAVIGATION SERVER AND NAVIGATION SYSTEM

(75) Inventors: Koji Sengoku, Minato-ku (JP); Aiko Sugawara, Minato-ku (JP); Masakuni Tsuge, Minato-ku (JP); Masayuki Arai, Wako (JP); Yoshitaka Kinoshita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 347 days.

(21) Appl. No.: 12/667,343

(22) PCT Filed: Jul. 3, 2008

(86) PCT No.: PCT/JP2008/001759
§ 371 (c)(1),
(2), (4) Date: Dec. 30, 2009

(87) PCT Pub. No.: WO2009/004814
PCT Pub. Date: Jan. 8, 2009

(65) Prior Publication Data
US 2010/0179751 A1    Jul. 15, 2010

(30) Foreign Application Priority Data
Jul. 5, 2007 (JP) .................................. 2007-177289

(51) Int. Cl.
*G01C 21/00* (2006.01)
(52) U.S. Cl. ............ 701/527; 701/24; 701/25; 701/117; 701/410; 701/411; 701/414; 701/418; 701/420
(58) Field of Classification Search .................. None
See application file for complete search history.

(56) References Cited

U.S. PATENT DOCUMENTS
7,668,650 B2 * 2/2010 Sumizawa et al. ............ 701/457
(Continued)

FOREIGN PATENT DOCUMENTS
JP    2000-55682    2/2000
(Continued)

OTHER PUBLICATIONS
International Search Report for Application No. PCT/JP2008/001759, dated Aug. 5, 2008.

*Primary Examiner* — Khoi Tran
*Assistant Examiner* — Ian Jen
(74) *Attorney, Agent, or Firm* — Nelson Mullins Riley & Scarborough LLP; Anthony A. Laurentano (57) ABSTRACT

A navigation device and the like capable of appropriately alleviating an amount of communicating information between the navigation server and a navigation device, from the viewpoint of guiding a user to a destination point via the navigation device, on the basis of a support route which is set by the navigation server. Of the links constituting a support route R which connects the current position $p_1$ and the destination position $p_2$ of the user, the links satisfying an extraction condition set according to a changing pattern of a road type are extracted as target links. Also, the target links, that is, the link having high necessity from the viewpoint of guiding the user, with regard to the changing pattern of the road type, is recognized by the navigation device 200 on the basis of communication between the navigation server 100 and the navigation device 200.

6 Claims, 6 Drawing Sheets

U.S. PATENT DOCUMENTS

| | | | |
|---|---|---|---|
| 7,688,228 B2 * | 3/2010 | Tanizaki et al. | 340/995.12 |
| 7,693,657 B2 * | 4/2010 | Endo et al. | 701/423 |
| 7,693,658 B2 * | 4/2010 | Nomura | 701/437 |
| 7,783,415 B2 * | 8/2010 | Yamane et al. | 701/117 |
| 7,783,421 B2 * | 8/2010 | Arai et al. | 701/420 |
| 7,860,645 B2 * | 12/2010 | Kim et al. | 701/423 |
| 7,860,647 B2 * | 12/2010 | Amano | 701/414 |
| 7,890,250 B2 * | 2/2011 | Um et al. | 701/417 |
| 7,894,986 B2 * | 2/2011 | Hegedus et al. | 701/426 |
| 7,920,964 B2 * | 4/2011 | Nomura | 701/410 |
| 7,920,966 B2 * | 4/2011 | Emoto et al. | 701/436 |
| 7,930,100 B2 * | 4/2011 | Tanizaki et al. | 701/451 |
| 8,086,403 B2 * | 12/2011 | Ishikawa | 340/988 |
| 2007/0100545 A1 * | 5/2007 | Morita et al. | 701/211 |
| 2007/0106458 A1 * | 5/2007 | Iwami et al. | 701/201 |
| 2007/0106459 A1 * | 5/2007 | Nakayama et al. | 701/201 |
| 2007/0106460 A1 * | 5/2007 | Nakayama et al. | 701/201 |
| 2007/0150185 A1 * | 6/2007 | Nagase et al. | 701/209 |
| 2007/0156334 A1 * | 7/2007 | Vu | 701/209 |
| 2008/0303693 A1 * | 12/2008 | Link, II | 340/905 |
| 2009/0018759 A1 * | 1/2009 | Endo et al. | 701/117 |

FOREIGN PATENT DOCUMENTS

| | | |
|---|---|---|
| JP | 2003-75178 | 3/2003 |
| JP | 2003-194561 | 7/2003 |
| JP | 2004-184107 | 7/2004 |
| JP | 2005-134209 | 5/2005 |
| JP | 2006-170978 | 6/2006 |

* cited by examiner

NAVIGATION SERVER AND NAVIGATION SYSTEM

RELATED APPLICATIONS

This application is a 35 U.S.C. 371 national stage filing of International Application No. PCT/JP2008/001759, filed Jul. 3, 2008, which claims priority to Japanese Patent Application No. 2007-177289 filed on Jul. 5, 2007 in Japan. The contents of the aforementioned applications are hereby incorporated by reference.

BACKGROUND OF THE INVENTION

1. Technical Field

The present invention relates to a navigation server which supports the guiding of the user by a navigation device, and the like.

2. Description of the Related Art

Conventionally, there has been proposed a technique of searching for a support route by a navigation server receiving a request from a navigation device, and transmitting the support route information to the navigation device (refer to Japanese Patent Laid-Open No. 2000-055682). Further, there has been proposed a technical method of segmenting the support route information and preferentially transmitting the segmented route information in the vicinity of a departure position, with the aim of shortening the transmission time of the support route information from the navigation server to the navigation device (refer to Japanese Patent Laid-Open No. 2004-184107).

However, it is not always true that the segmented route information in the vicinity of the departure position should be prioritized at all times, from the view point of guiding the user to the destination position by the navigation device on the basis of the support route, in view of the nature of the support route set by the navigation server.

SUMMARY OF THE INVENTION

In view of the above circumstances, an object to be solved by the present invention is to provide a navigation server and the like capable of appropriately alleviating an amount of communicating information between the navigation server and a navigation device, from the viewpoint of guiding a user to a destination point via the navigation device, on the basis of a support route which is set by the navigation server.

According to a first aspect of the present invention, there is provided a navigation server which supports guiding of a user by a navigation device, comprising: a support map storing unit which stores a support map information; a first support processing unit which recognizes a current position and a destination position of the user on the basis of communication with the navigation device, and which sets a support route which connects the current position and the destination position, on the basis of the support map information stored in the support map storing unit; and a second support processing unit which extracts a link satisfying an extraction condition set according to a changing pattern of a road type along the support route, among a plurality of the links constituting the support route set by the first support processing unit, as a target link, and makes the navigation device recognize the target links of a number equal to or less than a predetermined number in order from the link closest to the current position on the basis of communication with the navigation device.

According to the navigation server of the first aspect of the invention, the links satisfying the extraction condition, among the links constituting the support route which connects the current position and the destination position of the user, are extracted as the target links. Also, the target link, that is, the link having high necessity from the viewpoint of guiding the user, with regard to the changing pattern of the road type, is recognized by the navigation device on the basis of communication between the navigation server and the navigation device. Therefore, it becomes possible to appropriately alleviate the amount of communicating information between the navigation server and the navigation device when making the navigation device recognize a part of the links constituting the support route which is set by the navigation server, from the view point of guiding the user to the destination position via the navigation device on the basis of the support route.

The navigation server of a second aspect of the invention, is the navigation server of the first aspect of the invention, wherein the second support processing unit extracts the target link while taking the fact that the link includes a changing point of the road type along the support route as a starting point, an intermediate point or a terminal point, or the link continues to or from the link which includes the changing point of the road type as the intermediate point, as the extraction condition.

According to the navigation server of the second aspect of the invention, the amount of communicating information between the navigation server and the navigation device is appropriately alleviated, in view of the fact that the link in the vicinity of the change in the road type has high necessity from the view point of guiding the user to the destination position.

The navigation server of a third aspect of the invention, is the navigation server of the second aspect of the invention, wherein the second support processing unit extracts the target link, in a case where a distance from a k-th (k=1, 2, . . . ) changing point to a k+1-th changing point along the support route is equal to or more than a first predetermined distance, while taking the fact that the link includes the k-th changing point as the terminal point or the link includes the k+1-th changing point as the starting point as the extraction condition.

According to the navigation server of the third aspect of the invention, the amount of communicating information between the navigation server and the navigation device is appropriately alleviated, in view of the fact that in the case where the two adjacent changing points of the road type are close by, the link including the changing point has low necessity from the view point of guiding the user to the destination position.

The navigation server of a fourth aspect of the invention, is the navigation server of the first aspect of the invention, wherein the second support processing unit extracts the target link while taking the fact that, in the identical road type section in the support route, the link includes a point deviating by a second predetermined distance along the support route, or the link continues from the link including the point, as the extraction condition.

According to the navigation server of the fourth aspect of the invention, the amount of communicating information between the navigation server and the navigation device is appropriately alleviated, in view of the fact that in the case where the identical road type section continues for a long distance, the link in the section has low necessity from the viewpoint of guiding the use to the destination position.

The navigation server according to a fifth aspect of the invention, is the navigation server of the fourth aspect of the invention, wherein the second support processing unit extracts the link as the target link while taking the fact that, in the identical road type section in the support route, the distance from the terminal point of the link to the starting point of the next target link is equal to or more than a third predetermined distance as the extraction condition.

According to the navigation server of the fifth aspect of the invention, the amount of communicating information between the navigation server and the navigation device is appropriately alleviated, in view of the fact that in the case where the identical road type section continues for a long distance and at the same time the link in the section is near the next target link, the link in the section has low necessity from the view point of guiding the user to the destination position.

A navigation device of a sixth aspect of the invention is a navigation device which guides a user on the basis of communication with a navigation server, comprising: a navigation map storing unit which stores a navigation map information; a first processing unit which makes the navigation server recognize a current position and a destination position of the user on the basis of communication with the navigation server; and a second processing unit which recognizes a target link extracted by the navigation server as the link satisfying an extraction condition set according to a changing pattern of a road type along the support route, among a plurality of the links constituting the support route which connects the current position and the destination position set by the navigation server, of a number equal to or less than a predetermined number, on the basis of communication with the navigation server, sets a route on the basis of the navigation map information stored in the navigation map storing unit and the target links, and outputs the route.

According to the navigation device of the sixth aspect of the invention, the navigation device makes the navigation server extract the links satisfying the extraction condition, among the links constituting the support route which connects the current position and the destination position of the user, as the target links. Also, the target link, that is, the link having high necessity from the viewpoint of guiding the user, with regard to the changing pattern of the road type, is recognized by the navigation device on the basis of communication with the navigation server. Therefore, it becomes possible to appropriately alleviate the amount of communicating information between the navigation server and the navigation device when making the navigation device recognize a part of the links constituting the support route which is set by the navigation server, from the view point of guiding the user to the destination position via the navigation device on the basis of the support route.

A navigation system of a seventh aspect of the invention is configured from the navigation server according to the first aspect of the invention and the navigation server according to the sixth aspect of the invention.

According to the navigation server of the seventh aspect of the invention, it becomes possible to appropriately alleviate the amount of communicating information between the navigation server and the navigation device when making the navigation device recognize a part of the links constituting the support route which is set by the navigation server, from the view point of guiding the user to the destination position via the navigation device on the basis of the support route.

DETAILED DESCRIPTION OF THE PREFERRED EMBODIMENTS

An embodiment of a navigation system according to the present invention will now be explained below with reference to the accompanying drawings.

Figure 1:
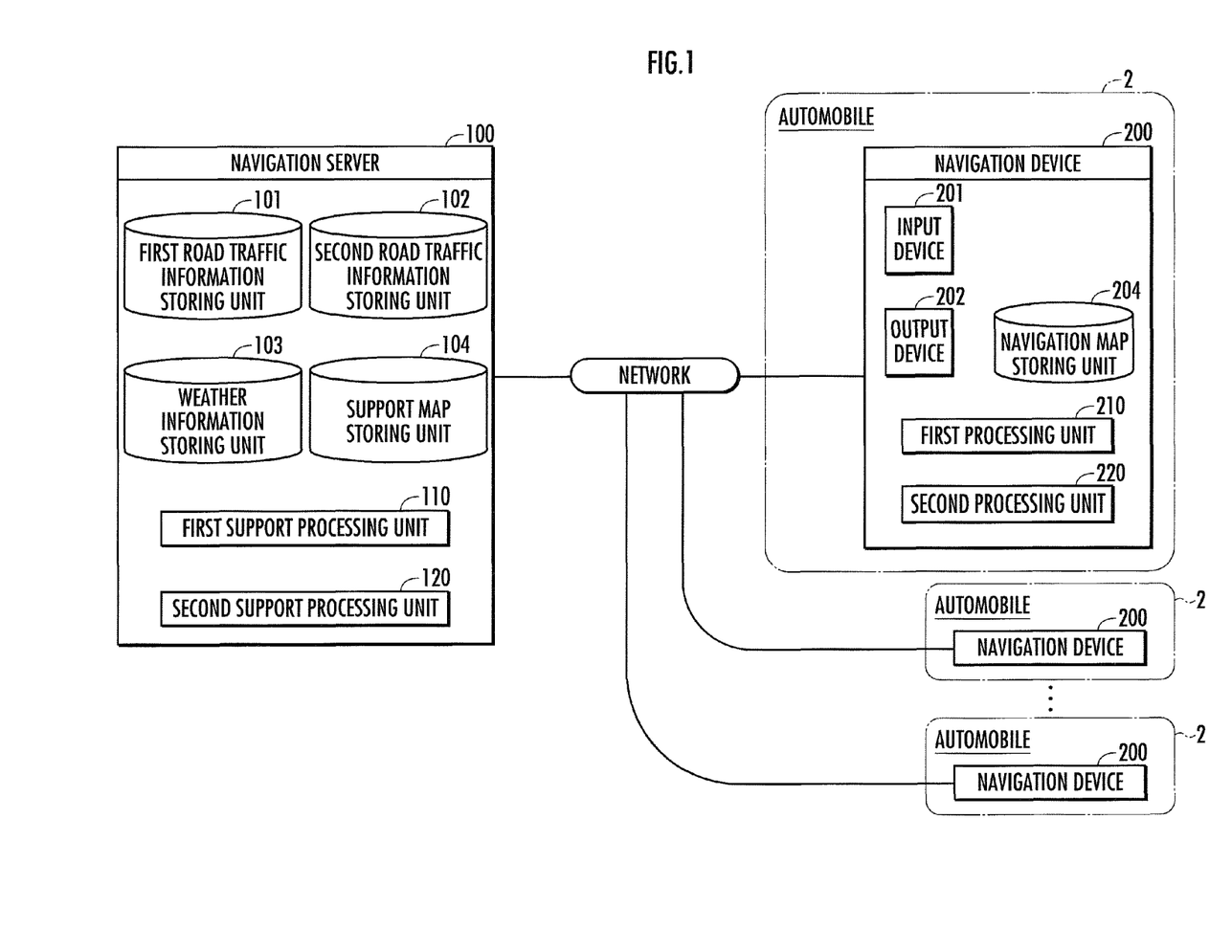
FIG. 1 is a view explaining the configuration of a navigation system according to the present invention.

The configuration of the navigation system of the present invention will be described below with reference to FIG. 1. The navigation system is configured from a navigation server 100, and a navigation device 200 mounted on an automobile (mobile device) 2. It should be noted that the navigation device 200 may be mounted in a mobile device other than an automobile. It is also acceptable for the navigation device 200 to be carried by a user.

The navigation server 100 is configured from one or a plurality of server computers. The navigation server 100 is equipped with a first road traffic information storing unit 101, a second road traffic information storing unit 102, a weather condition storing unit 103, a support map storing unit 104, a first support processing unit 110, and a second support processing unit 120.

The first road traffic information storing unit 101 is stored with a first road traffic information (required moving time, existence or not of a traffic jam and the like in individual link) based on a probe information (position of respective probe car at each time) transmitted or uploaded from the navigation device 200 mounted on the automobile 2 as a probe car or a floating car to the navigation server 100.

A second traffic information storing unit 102 is stored with a second road traffic information (required moving time, existence or nonexistence of a traffic jam and the like in individual link, and also information representing existence or nonexistence of traffic regulations in individual link, and information representing the existence or nonexistence of an event in the vicinity of individual link and the type of the event, or the like) transmitted from a road traffic information center server and the like to the navigation server 100.

A weather information storing unit 103 is stored with a weather information and the like in the vicinity of individual link transmitted from a weather information center server and the like to the navigation server 100.

The support map storing unit 104 is stored with a support map information. In the support map information, the location, shape and posture or the like of an individual link constituting a road are expressed by a series of coordinates ((latitude, longitude), or (latitude, longitude, altitude)). Moreover, individual link is tagged with link identifier for identifying individual link, and data representing the road type.

The first support processing unit 110 recognizes a current position and a destination position of the automobile 2 (or a user) on which the navigation device 200 is mounted, on the basis of communication with the navigation device 200. On the basis of the first road traffic information stored in the first road traffic information storing unit 101, the second road traffic information stored in the second road traffic information storing unit 102, the weather information and the like stored in the weather condition storing unit 103, and the support map information stored in the support map storing unit 104, the first support processing unit 110 sets a support route which connects the current position and the destination position.

The second support processing unit 120 extracts links satisfying an extracting condition which is set according to a changing pattern of a road type along the support route, among a plurality of links constituting the support route set by the first support processing unit 110, as target links. The second support processing unit 120 makes the navigation device 200 recognize the target links of a number equal to or less than a predetermined number in order from the link closest to the current position of the automobile 2, on the basis of communication with the navigation device 200.

The navigation device 200 is comprised of an ECU or a computer mounted in the automobile 2 as hardware, and a navigation program which is stored in a memory and which provides the computer with various functions as software. The navigation program may be pre-installed in the memory (ROM) in the vehicular computer, or a part of or all of the navigation program may be downloaded or broadcasted from a server (not shown) via a network or a satellite to the vehicular computer to be stored in the memory (EEPROM, RAM) or the like thereof at an arbitrary timing when there is a request or the like from the vehicular computer.

The navigation device 200 is equipped with an input device 201, an output device 202, a navigation map storing unit 204, a first processing unit 210, and a second processing unit 220.

The input device 201 is comprised of operating buttons or a microphone disposed in a center console or the like of the automobile 2, and enables a user to perform various settings by operation or voice output. The output device 202 is a display device disposed in the center console of the automobile 2 for displaying or outputting map information and the like. The navigation map storing unit 204 is stored with the navigation map information or the like to be output to the output device 202. In the navigation map information, the location, shape and posture or the like of an individual link constituting a road are expressed by a series of coordinates. Moreover, individual link is tagged with the link identifier for identifying individual link. Even though the definitions of the coordinates and the like in the navigation map information and the support map information are different due to the different specifications and data architectures therebetween, it is possible to match the links by tagging the identical links with common link identifier.

The first processing unit 210 makes the navigation server 100 recognize the current position and the destination position of the automobile 2, on the basis of communication with the navigation server 100. The second processing unit 220 recognizes the target links extracted by the navigation server 100, among a plurality of the links constituting the support route which is set by the navigation server 100. The second processing unit 220 sets a route on the basis of the target links, and the navigation map information stored in the navigation map storing unit 204, and also outputs the route via the output device 202.

It should be noted that the term a component as a hardware "recognizes" information means that the component performs a possible information processing on a piece of information to prepare the piece of information ready for other information processing, for example, the component receives the piece of information; searches the piece of information in a database or memory or retrieves the piece of information from a database or memory; calculates, estimates, configures, determines, searches the piece of information or the like via arithmetic processing on the basis of the received basic information or the like; visualizes information by decoding packages; and stores in memory or the like the calculated information or the like. Further, it should also be noted that the term a component as the hardware "outputs" information means that the component outputs information in all possible forms enabling a human being recognize the same via five senses such as visual perception, auditory perception, tactile perception and the like, for example, the component displays, auditory outputs, vibratory outputs the information and the like.

Figure 2:
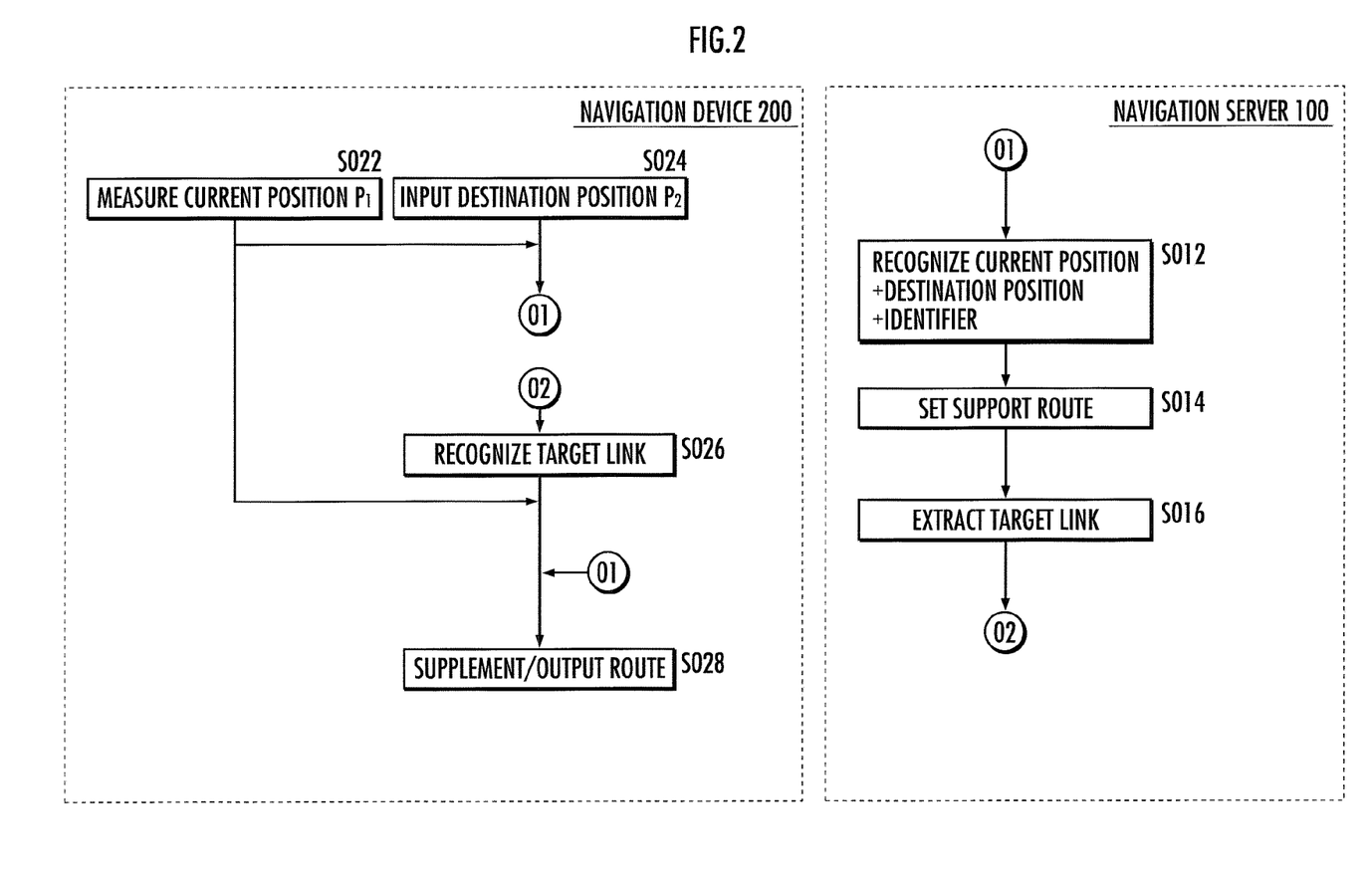
FIG. 2 is a view explaining the function of the navigation system according to the present invention.

The function of the navigation system with the abovementioned configuration will be explained below. In the navigation device 200, the first processing unit 210 measures a current position $p_1$ of the automobile 2 at regular intervals, on the basis of a GPS signal received by a communication device, or outputs from an acceleration sensor and a rate sensor or the like mounted on the automobile 2 (FIG. 2/S022). Further, the destination position $p_2$ of the automobile 2 is input by the user via the input device 201 (FIG. 2/S024). The first processing unit 210 transmits the destination position $p_2$ of the automobile 2 and the current position $p_1$ of the automobile 2 at the time of input of the destination position $p_2$ to the navigation server 100 together with a navigation identifier for identifying the navigation device 200.

Figure 6A:
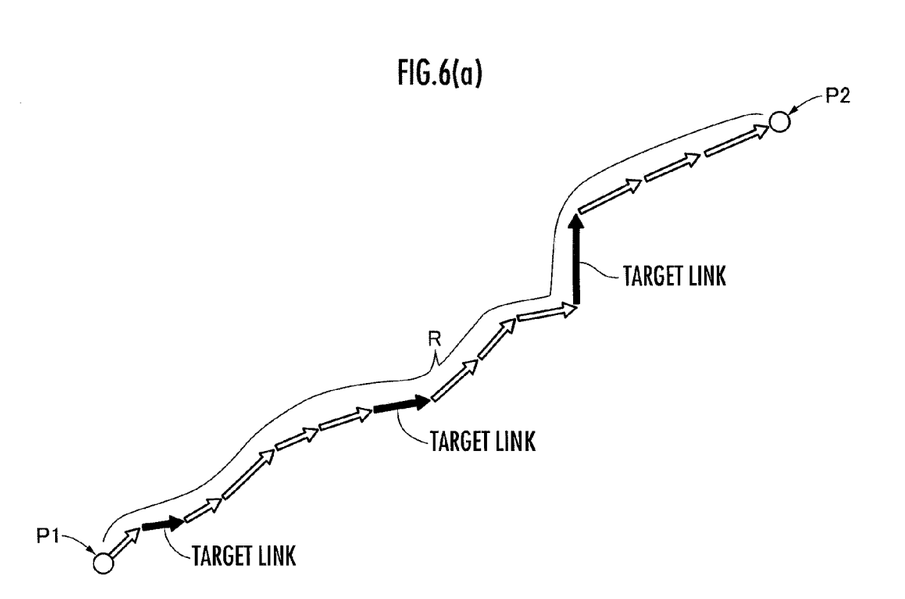
FIG. 6 is a view explaining a setting support route.

Accordingly, in the navigation server 100, the first support processing unit 110 recognizes the current position $p_1$ and the destination position $p_2$ of the automobile 2, and further the identifier of the navigation device 200 (FIG. 2/S012). Further, the first support processing unit 110 sets the support route R which connects the current position $p_1$ and the destination position $p_2$ of the automobile 2, on the basis of the first road traffic information stored in the first road traffic information storing unit 101, the second road traffic information stored in the second road traffic information storing unit 102, the weather information and the like stored in the weather condition storing unit 103, and the support map information stored in the support map storing unit 104, as is shown in FIG. 6(a) (FIG. 2/S014). The support route R is set under the condition such as having the shortest moving distance or the predicted required time until the destination position $p_2$, or having the best fuel consumption of the automobile 2 in traveling to the destination position $p_2$.

Further, the second support processing unit 120 extracts the links satisfying the extraction condition from a plurality of the links constituting the support route R which is set by the first support processing unit 110 as the target links (FIG. 2/S016). The extraction condition is a condition set according to the changing pattern of the road type in the support route R. Specifically, the target links are extracted as is explained below.

Figure 3A:
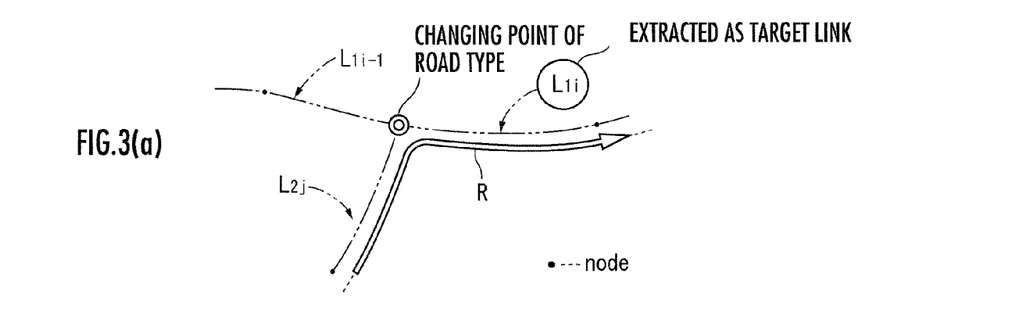
FIG. 3 is a view explaining an extracting method of a target link.
Figure 3B:
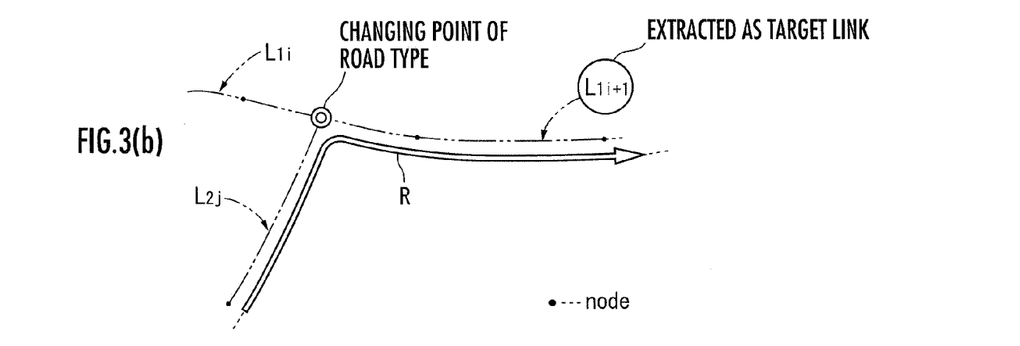

That is, the target links are extracted, while taking the fact that the link includes a changing point of the road type along the support route R as a starting point, an intermediate point or a terminal point, or the link continues to or from the link which includes the changing point of the road type as the intermediate point, as the extraction condition. For example, as is shown in FIG. 3(a), when the terminal point (node) of a second type link $L_{2j}$ of a second type road (indicated by a two-dot-and-dash line) overlaps the starting point (node) of a first type link $L_{1i}$ of a first type road (indicated by a dot-and-dash line) in the support route R, the first type link $L_{1i}$ having the changing point of the road type as the starting point is extracted as the target link. Also, as is shown in FIG. 3(b), when the terminal point of the second type link $L_{2j}$ overlaps the intermediate point of the first type link $L_{1i}$ in the support route R, the first type link $L_{1i+1}$ continuing from the first type link $L_{1i}$ which includes the changing point of the road type is extracted as the target link.

Figure 4A:
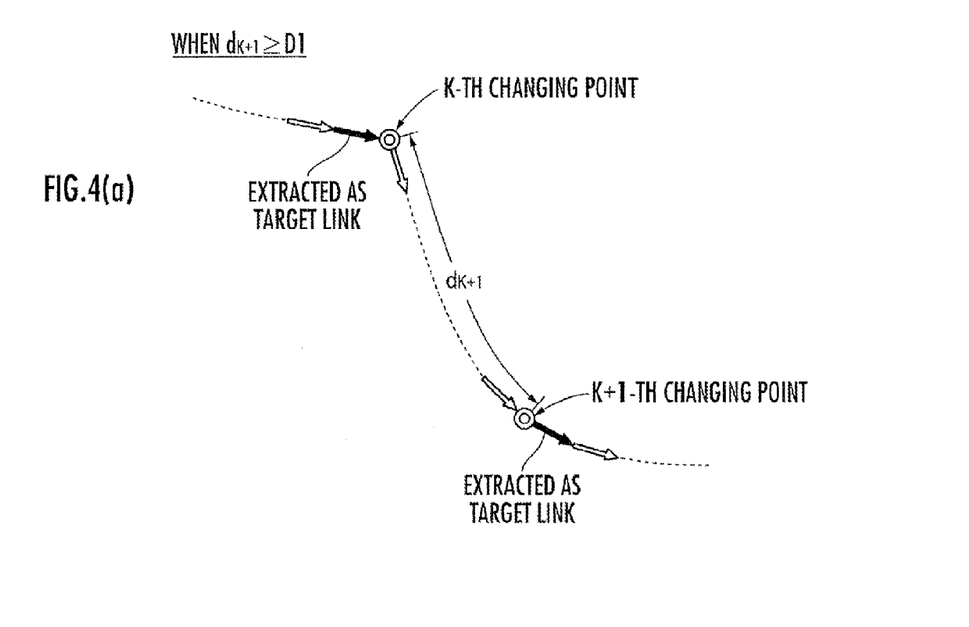
FIG. 4 is a view explaining the extracting method of the target link.
Figure 4B:
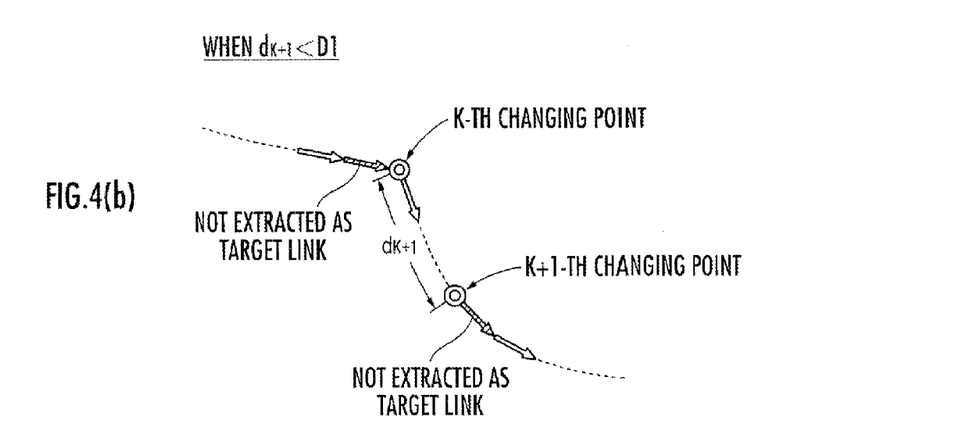

Further, in the case where a distance $d_{k+1}$ from a k-th (k=1, 2, . . . ) changing point to a k+1-th changing point along the support route R is equal to or more than a first predetermined distance $D_1$, the target links are extracted while taking the fact that the link includes the k-th changing point as the terminal point or the link includes the k+1-th changing point as the starting point as the extraction condition. For example, as is shown in FIG. 4(a), in the case where the distance $d_{k+1}$ is equal to or more than the first predetermined distance $D_1$, the link including the k-th changing point as the terminal point and the link including the k+1-th changing point as the starting point are extracted as the target links. On the other hand, as is shown in FIG. 4(b), in the case where the distance $d_{k+1}$ is less than the first predetermined distance $D_1$, the link including the k-th changing point as the terminal point and the link including the k+1-th changing point as the starting point are both not extracted as the target link.

Figure 5A:
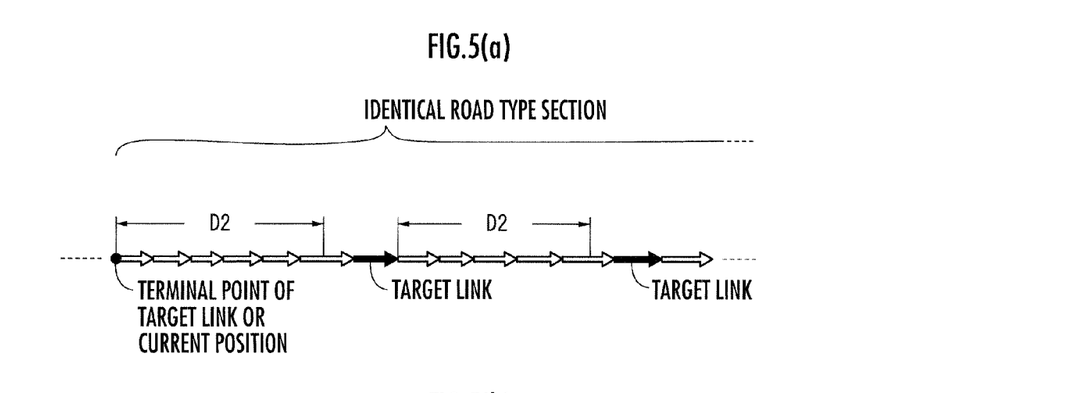
FIG. 5 is a view explaining the function of the extracting method of the target link.

Further, the target link is extracted while taking the fact that, in the identical road type section in the support route R, the link includes a point deviating by a second predetermined distance $D_2$ along the support route R, or the link continues from the link including the point, as the extraction condition. For example, as is shown in FIG. 5(a), in the identical road type section taking the current position $p_1$ of the automobile 2 or the terminal point of the target link as the starting point, the links continuing from the link including the point deviating by the second predetermined distance $D_2$ are extracted as the target link.

Figure 5B:
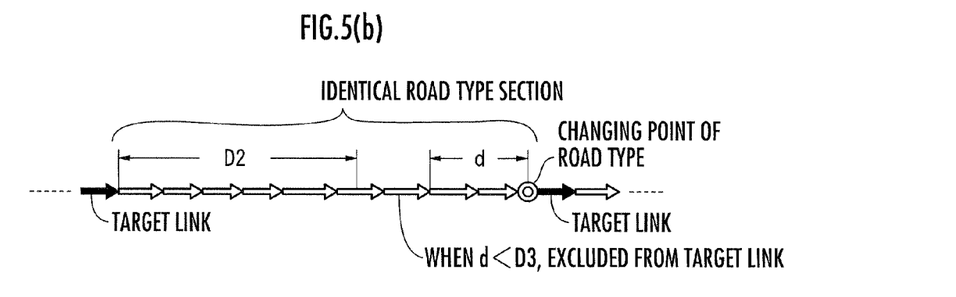

Further, the target link is extracted while taking the fact that, in the identical road type section in the support route R, a distance d from the terminal point to the starting point of the next target link is equal to or more than a third predetermined distance $D_3$ as the extraction condition. For example, as is shown in FIG. 5(b), the link in which the distance d is less than the third predetermined distance $D_3$ is not extracted as the target link.

Here, it may be configured that information indicating the version of the navigation map information is transmitted or uploaded to the navigation server 100 from the navigation device 200, and the determination on whether or not the target link is included in that version of the navigation map information at the navigation server 100. In this case, the other target link may be extracted when the determination result is negative. Further, of a plurality of the versions of the support map information stored in the support map storing unit 104 at the navigation server 100, the version of the support map information matching the version of the navigation map information may be selected, and the target link may be extracted from the selected support map information.

Figure 6B:
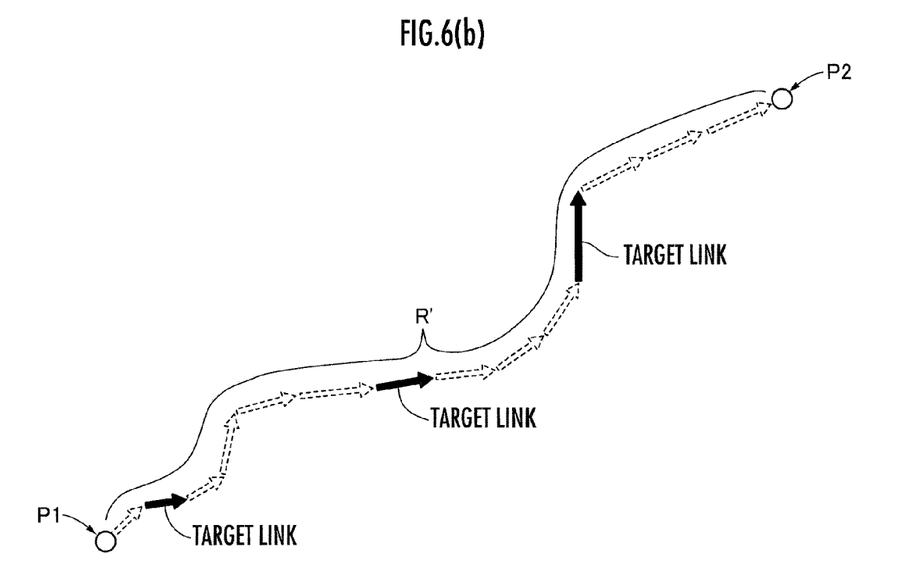

Further, the second support processing unit 120 transmits information or data for identifying the target link to the navigation device 200 identified by the identifier which is recognized by the first support processing unit 110. Accordingly, in the navigation device 200, the second processing unit 220 recognizes the target links (FIG. 2/S026). Further, the second processing unit 220 sets a route R' on the basis of the target links, the navigation map information stored in the navigation map storing unit 204, the current position (this may be the current position of the automobile 2 at a time different from the time of input of the destination position $p_2$) $p_1$ of the automobile 2, and the destination position $p_2$ input earlier, and outputs the same to the output device 202 (FIG. 2/S028). By doing so, as is shown in FIG. 6(b), the route R' is set so as to supplement the target links (black arrows) by other links (broken line arrows). Here, in addition to the route R', icons and the like representing the current position $p_1$ and representing the direction of movement of the automobile 2 are output or displayed along with the navigation map information indicating the road and facilities.

According to the navigation system exerting the above functions, in the navigation server 100, the links satisfying the extraction condition among the links constituting the support route R which connects the current position $p_1$ and the destination position $p_2$ of the automobile 2 are extracted as the target link (refer to FIG. 2/S016, FIG. 3 through FIG. 5). Also, the target link, that is, the link having high necessity from the viewpoint of guiding the user, with regard to the changing pattern of the road type, is recognized by the navigation device 200 on the basis of communication between the navigation server 100 and the navigation device 200 (refer to FIG. 2/S026, FIG. 6(b)). The support route R' as is shown in FIG. 6(b) is set by the navigation device 200, on the basis of the target links that are a part of the support route R set by the navigation server 100 as is shown in FIG. 6(a). By selecting the target links appropriately, both the support route R and route R' becomes identical or almost identical. As is explained above, only by transmitting information or data indicating a part of the support route set by the navigation server 100 to the navigation device 200, the navigation device 200 may reproduce the support route R with high precision. Therefore, it becomes possible to appropriately alleviate the amount of communicating information between the navigation server 100 and the navigation device 200 when making the navigation device 200 recognize a part of the links constituting the support route R which is set by the navigation server 100, from the view point of guiding the user to the destination position $p_2$ via the navigation device 200 on the basis of the support route R.

FIG. 1

100: navigation server
101: first road traffic information storing unit
102: second road traffic information storing unit
103: weather information storing unit
104: support map storing unit
110: first support processing unit
120: second support processing unit
network
2: automobile
200: navigation device
201: input device
202: output device
204: navigation map storing unit
210: first processing unit
220: second processing unit

FIG. 2

200: navigation device
S022: measure current position p1
S024: input destination position p2
S026: recognize target link
S028: supplement/output route
100: navigation server
S012: recognize current position+destination position+identifier
S014: set support route
S016: extract target link

FIG. 3(a)

changing point of road type
extracted as target link

FIG. 3(b)

changing point of road type
extracted as target link

FIG. 4(a)

when $d_{k+1} \geq D1$
k-th changing point
extracted as target link
k+1-th changing point
extracted as target link

FIG. 4(b)

when $d_{k+1} \leq D1$
k-th changing point
not extracted as target link
k+1-th changing point
not extracted as target link

FIG. 5(a)

identical road type section
terminal point of target link or current position
target link
target link

FIG. 5(b)

identical road type section
target link
when $d<D3$, excluded from target link
changing point of road type
target link

FIG. 6(a)

target link

FIG. 6(b)

target link

The invention claimed is:

1. A navigation server which supports guiding of a user by a navigation device, comprising:
a support map storing unit which stores a support map information;
a first support processing unit which recognizes a current position and a destination position of the user on the basis of communication with the navigation device, and which sets a support route which connects the current position and the destination position, on the basis of the support map information stored in the support map storing unit; and
a second support processing unit which extracts a link, in a case where a distance from a k-th (k=1, 2, . . . ) changing point of a road type to a k+1-th changing point along the support route is equal to or more than a first predetermined distance, while taking the fact that the link includes the k-th changing point as a terminal point or the link includes the k+1-th changing point as a starting point, as the extraction condition, among a plurality of the links constituting the support route set by the first support processing unit, as a target link, and makes the navigation device recognize the target links of a number equal to or less than a predetermined number in order from the link closest to the current position on the basis of communication with the navigation device by a processor.

2. The navigation server according to claim 1, wherein the second support processing unit extracts the target link while taking the fact that, in the identical road type section in the support route, the link includes a point deviating by a second predetermined distance along the support route, or the link continues from the link including the point, as the extraction condition.

3. The navigation server according to claim 2, wherein the second support processing unit extracts the link as the target link while taking the fact that, in the identical road type section in the support route, the distance from the terminal point of the link to the starting point of the next target link is equal to or more than a third predetermined distance as the extraction condition.

4. A navigation system configured from a navigation device and a navigation server which supports guiding of a user by the navigation device,
the navigation server comprising:
a support map storing unit which stores a support map information;
a first support processing unit which recognizes a current position and a destination position of the user on the basis of communication with the navigation device, and which sets a support route which connects the current position and the destination position, on the basis of the support map information stored in the support map storing unit; and
a second support processing unit which extracts a link, in a case where a distance from a k-th (k=1, 2, . . . ) changing point of a road type to a k+1-th changing point along the support route is equal to or more than a first predetermined distance, while taking the fact that the link includes the k-th changing point as a terminal point or the link includes the k+1-th changing point as a starting point, as the extraction condition, among a plurality of the links constituting the support route set by the first support processing unit, as a target link, and makes the navigation device recognize the target links of a number equal to or less than a predetermined number in order from the link closest to the current position on the basis of communication with the navigation device;
the navigation device comprising:
a navigation map storing unit which stores a navigation map information;
a first processing unit which makes the navigation server recognize the current position and the destination position of the user on the basis of communication with the navigation server; and
a second processing unit which recognizes the target link extracted by the navigation server, among a plurality of the links constituting the support route which connects the current position and the destination position set by the navigation server, of a number equal to or less than a predetermined number, on the basis of communication with the navigation server, sets a route on the basis of the navigation map information stored in the navigation map storing unit and the target links, and outputs the route by a processor.

5. The navigation server according to claim 4, wherein the second support processing unit extracts the target link while taking the fact that, in the identical road type section in the support route, the link includes a point deviating by a second predetermined distance along the support route, or the link continues from the link including the point, as the extraction condition.

6. The navigation server according to claim 5, wherein the second support processing unit extracts the link as the target link while taking the fact that, in the identical road type section in the support route, the distance from the terminal point of the link to the starting point of the next target link is equal to or more than a third predetermined distance as the extraction condition.

* * * * *